United States Patent [19]
Wittle et al.

[11] Patent Number: 5,614,077
[45] Date of Patent: Mar. 25, 1997

[54] ELECTROCHEMICAL SYSTEM AND METHOD FOR THE REMOVAL OF CHARGED SPECIES FROM CONTAMINATED LIQUID AND SOLID WASTES

[75] Inventors: J. Kenneth Wittle, Chester Springs; Sibel Pamukcu, Bethlehem, both of Pa.

[73] Assignees: Electro-Petroleum, Inc., Wayne; Lehigh University, Bethlehem, both of Pa.

[21] Appl. No.: 420,988

[22] Filed: Apr. 10, 1995

[51] Int. Cl.$^6$ .................................................... C25C 1/22
[52] U.S. Cl. ................... 205/704; 205/766; 205/771; 204/515; 204/627; 204/648; 588/204
[58] Field of Search ........................... 204/182.2, 180.1, 204/301, 515, 627, 648; 588/204; 205/704, 766, 771

[56] References Cited

U.S. PATENT DOCUMENTS

| | | | |
|---|---|---|---|
| 2,831,804 | 1/1956 | Collopy | 204/131 |
| 3,320,175 | 7/1961 | Podberesky et al. | 252/301.1 |
| 3,782,465 | 1/1974 | Bell et al. | 166/248 |
| 3,980,547 | 9/1976 | Kunkle | 204/301 |
| 4,056,482 | 11/1977 | Schmieder et al. | 204/149 |
| 4,258,081 | 3/1981 | Kadija | 427/121 |
| 4,278,524 | 7/1981 | Kadija | 204/252 |
| 4,338,215 | 7/1982 | Shaffer et al. | 252/628 |
| 4,367,132 | 1/1983 | Bell et al. | 204/151 |
| 4,382,341 | 5/1983 | Bell et al. | 166/248 |
| 4,468,360 | 8/1984 | Kadija | 204/252 |
| 4,473,114 | 9/1984 | Bell et al. | 166/248 |
| 4,495,990 | 1/1985 | Titus et al. | 166/65 R |
| 4,544,474 | 10/1985 | Kadija | 204/295 |
| 4,615,776 | 10/1986 | Sasaki et al. | 204/130 |
| 4,623,469 | 11/1986 | Conner | 210/751 |
| 4,645,625 | 2/1987 | Lundstrom | 204/182.4 |
| 4,670,360 | 6/1987 | Habermann et al. | 204/149 |
| 4,676,878 | 6/1987 | Chez | 204/101 |
| 4,685,220 | 8/1987 | Meenan et al. | 34/10 |
| 4,861,444 | 8/1989 | Schoessow et al. | 204/130 |
| 4,869,794 | 9/1989 | Koehly et al. | 204/130 |
| 4,891,116 | 1/1990 | Stritzke | 204/241 |
| 4,931,153 | 6/1990 | Otsuka et al. | 204/39 |
| 5,055,237 | 10/1991 | Husseiny | 204/82.5 |
| 5,074,986 | 12/1991 | Probstein et al. | 204/130 |
| 5,102,510 | 4/1992 | Darian | 204/59 R |
| 5,102,511 | 4/1992 | Suwa et al. | 204/93 |
| 5,137,608 | 8/1992 | Acar et al. | 204/130 |
| 5,198,083 | 3/1993 | Thornton | 204/149 |
| 5,306,399 | 4/1994 | Bradbury et al. | 204/182.4 |
| 5,433,829 | 7/1995 | Pool | 204/130 |
| 5,494,863 | 2/1996 | Mathur | 501/12 |

OTHER PUBLICATIONS

Hamed et al, "Pb (II) Removal From Kaolinite By Electro-kinetics", Journal of Geotechnical Engineering, vol. 2, pp. 241–271, Feb. 1991.

Acar et al, "Principles of Electrokinetic Remediation", Environmental Science & Technology, vol. 27, 1993, pp. 2638–2647.

Jacobs et al, "Model and Experiments On Soil Remediation By Electric Fields", presented at ACS Emerging Technologies in Hazardous Waste Management V, Sep. 27, 1993.

*Primary Examiner*—Bruce F. Bell
*Assistant Examiner*—Kishor Mayekar
*Attorney, Agent, or Firm*—Dann, Dorfman, Herrell and Skillman

[57] ABSTRACT

An electrokinetic system and method are provided for removing charged species from a sample in which said charged species is commingled with at least one radionuclide. The apparatus comprises an anode compartment comprising an anode, a cathode compartment comprising a cathode, and a treatment zone in fluid communication with the anode and cathode compartments for containing the sample. The anode compartment, cathode compartment, and treatment zone are arranged so that a voltage gradient applied between the anode and the cathode induces an electrical current flow through the sample in the treatment zone. The current causes migration of the positively charged species in the sample toward the cathode and the negatively charges species toward the anode. A pH controller is provided for monitoring and adjusting acidity and basicity to facilitate the removal of salts while maintaining contaminants within the sample.

34 Claims, 4 Drawing Sheets

ELECTROCHEMICAL SYSTEM AND METHOD FOR THE REMOVAL OF CHARGED SPECIES FROM CONTAMINATED LIQUID AND SOLID WASTES

FIELD OF THE INVENTION

The present invention relates to a system and method for removing charged species from a contaminated liquid or a porous solid waste material, e.g., from reprocessing of nuclear fuel. More specifically, the present invention relates to such a system and method whereby soluble salts are electrochemically/electrokinetically removed from contaminated wastes, sludges, soils, and the like to facilitate immobilization of the contaminants present therein, e.g., radionuclides, via vitrification.

BACKGROUND OF THE INVENTION

Electrokinetic processes have been shown to be useful in the decontamination of soils and industrial sludges. Typically, a voltage gradient is applied between an anode and a cathode so that an electric current is produced. The current induces water, ions and charged particles to migrate towards the anode or the cathode. Water flows from the anode toward the cathode by a process known as electroosmosis in soils containing negative surface charged particles. The process is expected to reverse direction when the soil contains predominantly positively charged particles. The flow of water transports particles that are dissolved or suspended in the water. In addition, anions or negatively charged species migrate toward the anode, while cations or positively charged species migrate toward the cathode. Further, positively and negatively charged colloidal particles are also induced to migrate toward the cathode and the anode, respectively, by the electrical current. As a result, positively and negatively charged species can be concentrated around the cathode and the anode for subsequent removal.

Electrokinetics has been used to improve and reclaim land by lowering the water content and subsequently densifying the soil in high water content areas and also facilitating the removal of unwanted salts from the soil. It is well known that certain soils contain excessive amounts of saline or alkali salts and that these salts can substantially reduce the agricultural utility of the soil. Typically, a cathode is placed along the bottom of a drainage ditch. A series of anodes are driven into the soil in a line generally parallel to the ditch. When an electric current is applied, an increase in the amount and the salinity of the water in the drainage ditch is observed. Alternatively, electrokinetic processes can be used to enhance the removal of contaminants from soils through leaching. Porous electrodes can be utilized so that a leaching fluid, such as water, is supplied to the anode. The electric current induces the fluid to flow toward the cathode. The flow of fluid causes the contaminants to collect near the cathode where they can be removed through the pores in the cathode by pumping.

In addition, electrokinetic processes have been used to enhance the settling rate, filterability, and dewatering of industrial sludge. Direct dewatering of the sludge is achieved by passing an electrical current through the sludge between a pair of perforated electrodes. Water flows toward the cathode due to electroosmosis and is collected as it passes through the perforated cathode. In addition, ionic particles accumulate near the anode as a result of electrophoresis, where they can be collected as they pass through the perforated anode.

However, electrochemical/electrokinetic processes have heretofore not been used in treating nuclear fuel reprocessing liquid tank, and cake wastes. These wastes typically have a high salt content and are contaminated with fission products which have long half-lives such as plutonium, cesium, and the actinides. These waste products are preferably transformed into a suitable, stable waste form before disposal to minimize the potential for environmental contamination.

One such waste form is produced when a solid state radioactive waste material is bonded to a cathode by electrodepositing a corrosion-resistant metal, such as copper, onto the cathode in the presence of the waste material. The waste material is thus incorporated into a matrix of metal as the metal is electrodeposited onto the cathode. This technique requires that the waste be in a suitable form, such as radionuclide containing oxide, oxyhydroxide, or hydroxide particles. The waste must be essentially insoluble in the electrolytic solution used for the electrodeposition and must be capable of being brought into contact with the cathode. This is often accomplished by forming the waste into a suitable size and shape, such as a pellet, or by coating or mixing the waste with a conductive material.

Another such suitable waste form would be a non-leaching vitrified product, such as a glass or ceramic. Techniques for vitrifying waste are generally known, and examples of methods for vitrification of contaminated soil are described in an application for a U.S. patent Ser. No. 08/266,209 (Wittle et al.) and a Department of Energy Report (PNL-8525, June 1993), which are both incorporated by reference in the present application as if set forth herein in full. A problem arises, however, since the amount of salt which can be stabilized in a vitreous product is limited. This is a formidable problem since much of the radioactive waste, such as that produced by nuclear fuel reprocessing, contains unacceptably high salt contents. It is therefore necessary to remove the salt from the waste while retaining the fission products within the waste before the waste is vitrified.

Accordingly, a system and method having the capability of removing charged species from contaminated liquids and porous solids is a highly desirable objective. In particular, the system and method should be applicable to the removal of various salts from industrial sludges, contaminated soils, and nuclear wastes which are commingled with radionuclides. The system and method should enable the selective removal of the salts while maintaining the radionuclides within the sludge, soil, or waste for conversion to an immobilized form. In addition, the system and method should be efficient, cost effective, and applicable to a wide range of waste materials.

SUMMARY OF THE INVENTION

In accordance with the present invention there is provided a system and method for removing charged species from contaminated liquids and porous solids. The present invention is particularly adapted to the removal of salts from samples contaminated with radionuclides and/or cationic heavy metals, such as industrial sludges, soils, and nuclear wastes. The present invention provides for the selective removal of the salts while maintaining the radionuclides and/or heavy metals within the sludge, soil, or waste material. In addition, the system and method of the present invention can be implemented efficiently and cost effectively for treatment of a wide range of waste materials.

The system of the present invention comprises an anode compartment including an anode, a cathode compartment including a cathode, and a treatment zone which is in fluid communication with the anode and the cathode compartments for containing the waste material undergoing treatment. The anode compartment, cathode compartment, and treatment zone are arranged so that a voltage gradient applied between the anode and the cathode produces an electrical current that flows through the sample in the treatment zone. This current induces water, ions and charged particles to migrate through the sample toward either the anode compartment or the cathode compartment, depending upon whether the particle is positively or negatively charged.

The ability to selectively separate the salts from the sample while maintaining the radionuclides and/or heavy metals within the sample is effected either by controlling the pH of the sample, utilizing matrix materials having an affinity for the radionuclides and/or heavy metals, or both.

The system of the present invention can comprise a pH controller for monitoring and adjusting the pH of the sample. Since many radionuclides and heavy metals are known to precipitate at pH levels below a predetermined level, the pH controller may be used to maintain the pH of the sample below that level thereby causing the radionuclide or heavy metal to precipitate in the sample and not reach the anode or cathode compartments.

Alternatively, or additionally, the system of the invention can comprise a matrix material which has affinity for anions present in the waste material, and which is positioned between the anode compartment and the treatment zone. The matrix material is chosen to selectively allow passage of the anions of the salt while retarding movement of any anionic species containing the radionuclides and heavy metals. Thus, the radionuclides and heavy metals are prevented from migrating toward the anode, and are effectively entrapped in the matrix material.

Similarly, the system of the present invention can comprise a matrix material with affinity for cations positioned between the cathode compartment and the treatment zone. The matrix material is chosen to selectively allow passage of the cations of the salt while retarding movement of any cationic species containing the radionuclides and heavy metals. Thus, as the cationic species sought to be removed from the waste material migrate toward the cathode, the radionuclides and heavy metals are entrapped in the matrix material.

The method of the present invention comprises providing an electrochemical/electrokinetic apparatus in accordance with the present invention in which a sample of the waste material to be treated is deposited in the treatment zone of the apparatus. A voltage gradient is then applied between the anode and the cathode of the apparatus. The voltage gradient causes an electrical current to flow from the cathode to the anode through the sample. The current induces water and charged species within the sample to migrate either towards the anode or towards the cathode, depending upon the predominant surface charge on the sample and whether the species are negatively or positively charged. The movement of water and charged species causes the charged species to be concentrated in certain areas of the apparatus where the charged species can then be isolated.

In one embodiment of the method of the present invention, salts contained within the sample are selectively separated from radionuclides and any heavy metals present in the sample by adjusting the pH of the sample. By adjusting the pH, species containing the radionuclides and the heavy metals can be precipitated within the sample.

In an alternative embodiment of the method of the invention, salts are selectively separated from anions contained within the sample by introducing a matrix material having affinity for anions between the sample and the anode compartment of the electrochemical/electrokinetic apparatus. Analogously, salts may be selectively separated from cations contained within the sample by introducing a matrix material having affinity for cations between the sample and the cathode compartment of the electrochemical/electrokinetic apparatus.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE PREFERRED EMBODIMENTS

Figure 1:
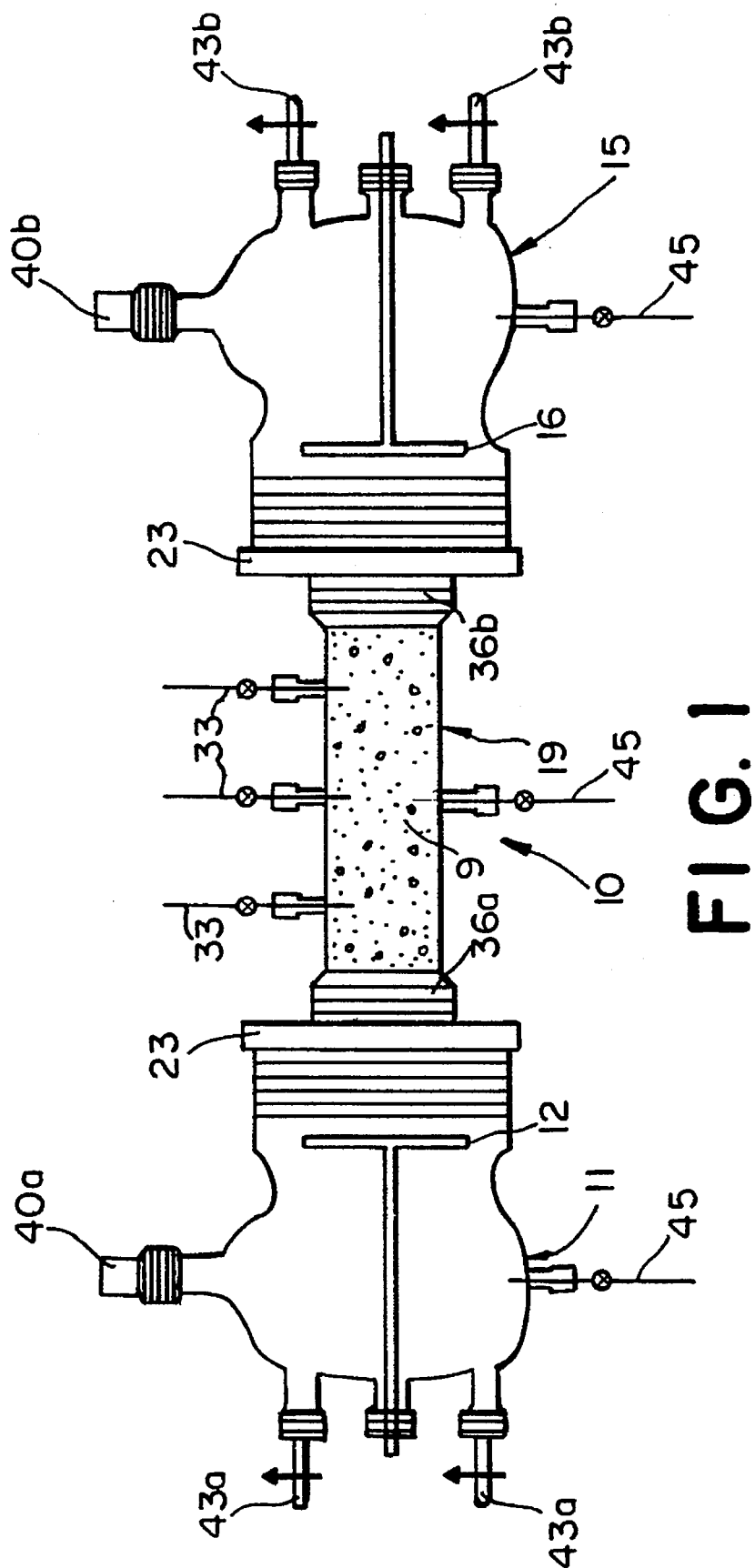
FIG. 1 is a side elevational view of an electrochemical/electrokinetic system of the present invention for treatment of contaminated waste.

The present invention relates to an electrochemical/electrokinetic system for removing soluble salts e.g. sodium, potassium and/or ammonium salts, as well as chlorides and/or nitrates from contaminated waste. The system 10, as depicted in FIG. 1, comprises an anode compartment 11 containing anode 12 and a cathode compartment 15 containing cathode 16. A treatment zone 19, for containing a sample 9 of the waste material to be treated, is disposed between and in fluid communication with the anode compartment 11 and the cathode compartment 15. In the embodiment shown in FIG. 1, the treatment zone 19 is manufactured from a cylindrical tube, such as a glass tube. The treatment zone 19 is secured to the anode compartment 11 and cathode compartment 15 by teflon adaptors 23. However, the treatment zone 19 may instead comprise an in-situ mass of soil, such as is found at a contamination site. At least one of the anode compartment 11, the cathode compartment 15, and the treatment zone 19 further comprise a pH controller 45 for monitoring and adjusting acidity and basicity.

Preferably, the anode 12 and the cathode 16 have electrode surfaces that are larger than the cross-sectional area of the treatment zone 19 so that a low current density at the electrodes, 12 and 16, will provide a relatively large current density in the sample 9. For example, electrode assemblies with surface areas of 22.6 cm (8.9 inches) may be constructed of graphite rods held together with conductive adhesives, or of appropriate stainless steel alloys.

Figure 2:
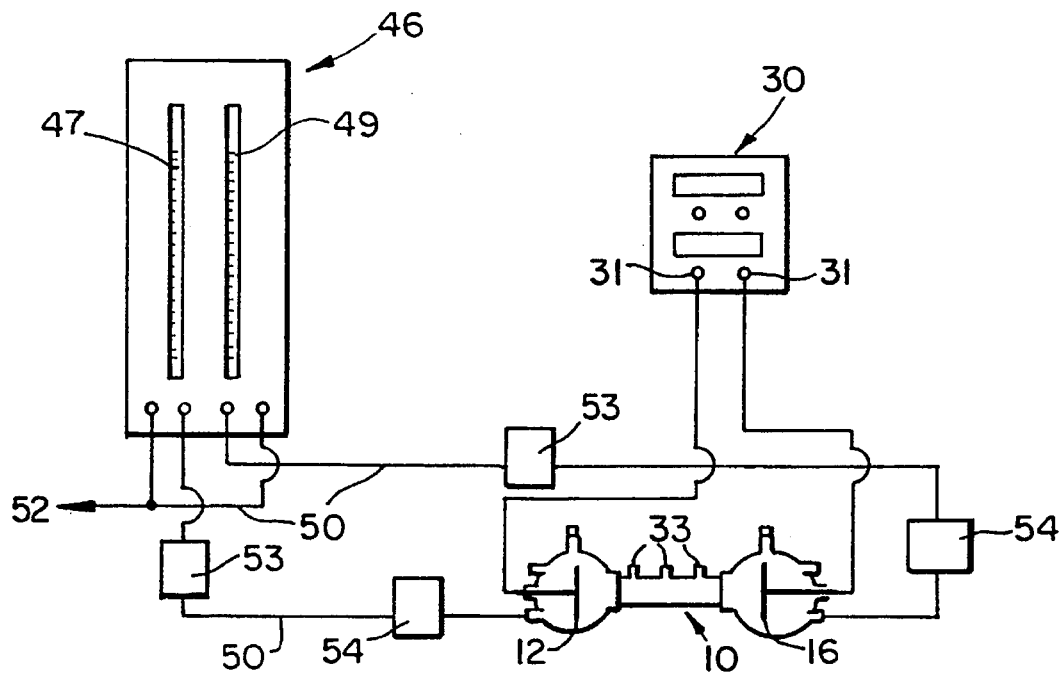
FIG. 2 is a schematic representation of the electrochemical/electrokinetic system of FIG. 1 showing the electrical and fluid connections.

As shown in FIG. 2, the anode 12 and the cathode 16 are electrically connected to the terminals 31 of a variable direct current (DC) power supply 30. The power supply 30 is used to produce a voltage gradient between the anode 12 and the cathode 16.

The treatment zone 19 can optionally comprise at least one auxiliary electrode 33 for monitoring the electrical current flowing through the sample 9. The auxiliary electrode 33 extends into the treatment zone 19 so that the electrode 33 is in contact with the sample 9 when the sample 9 is contained within the treatment zone 19.

Preferably, porous separators 36a and 36b are disposed between the treatment zone 19 and each of the anode compartment 11 and the cathode compartment 15 for preventing the sample 9 from entering the anode and the cathode compartments. The porous separators 36 can be manufactured from essentially any porous substance. The porous separators 36, however, preferably consist of either alumina frit or carborundum stones.

The anode compartment 11 and the cathode compartment 15 may also comprise a gas vent 40a and 40b for venting gases that are generated at the anode 12 and the cathode 16 by electrolysis.

In addition, the anode compartment 11 and the cathode compartment 15 can be equipped with supply ports 43a and 43b for introducing or removing an electrolytic solution from the anode compartment 11 and the cathode compartment 15. Although essentially any electrolytic solution can be used, water is preferred. As shown in FIG. 2, the anode and the cathode supply ports, 43a and 43b, are both connected to an electrolyte supply sub-system 46. The sub-system 46 preferably comprises a first solution reservoir 47, such as a burette, attached to the anode supply port 43a and a second solution reservoir 49 attached to the cathode supply port 43b. The reservoirs, 47 and 49, can be attached to the supply ports, 43a and 43b, using conventional tubing 50, such as teflon tubing. The supply ports, 43a and 43b, can also be connected to a drain 52 to drain the liquid solution from the anode and the cathode compartments, 11 and 15. One or more pumps 54 can optionally be provided to facilitate supplying the solution to or draining the solution from the anode and the cathode compartments, 11 and 15. In addition, at least one flow monitor 53 can be attached to the supply ports, 43a and 43b, for monitoring flow of the electrolytic solution.

Figure 3:
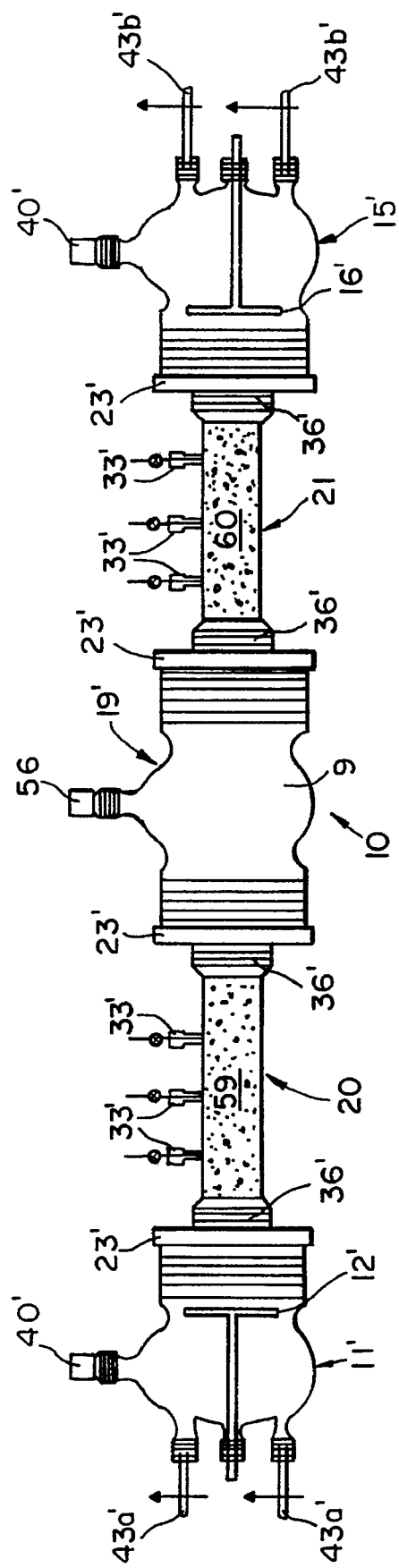
FIG. 3 is a side elevational view of another embodiment of an electrochemical/electrokinetic system in accordance with the present invention.
Figure 5:
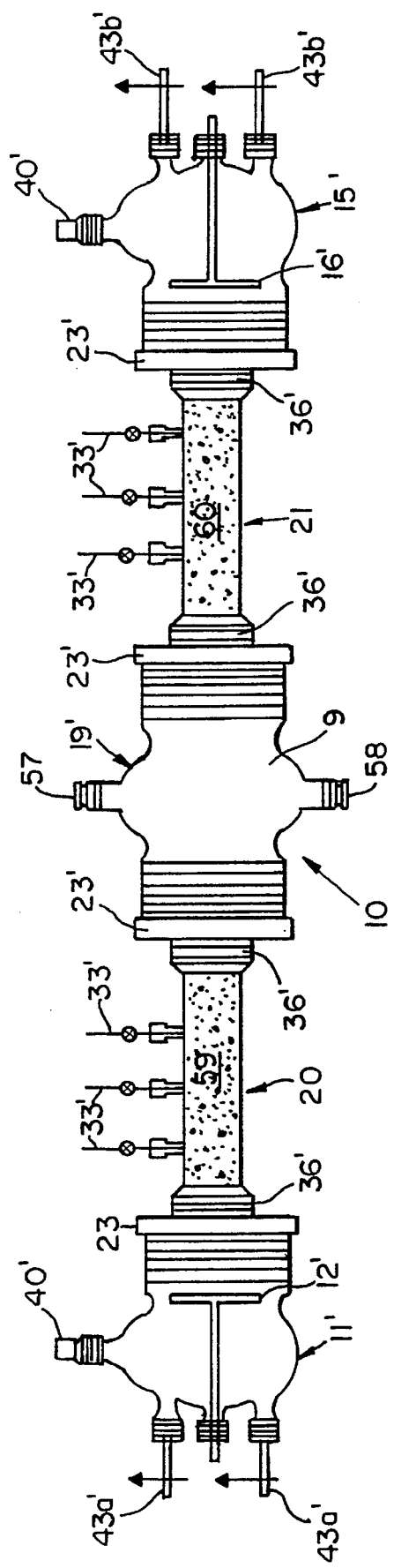
FIG. 5 is a side elevational view of a third embodiment of an electrochemical/electrokinetic system in accordance with the present invention.

Another embodiment of the present invention is depicted in FIG. 3. The anode and the cathode compartments, 11' and 15', are essentially the same as described above with reference to FIG. 1. A first chamber 20 is disposed adjacent the anode compartment 11' and a second chamber 21 is disposed adjacent the cathode compartment 15'. Disposed between the first and second chambers, 20 and 21, is a treatment zone 19'. The treatment zone 19' functions to contain the sample 9. In the embodiment shown in FIG. 3, the treatment zone 19' comprises a cylindrical tube which, together with chambers 20 and 21, defines the treatment zone 19'. The treatment zone 19' is secured to the first and the second chambers, 20 and 21, by teflon adaptors 23'. An optional feed port 56 may be provided for introducing the sample 9 into the treatment zone 19'. Alternatively, as shown in FIG. 5, the treatment zone 19' comprises an inlet 57 for continually flowing untreated sample 9 into the treatment zone 19' and an outlet 58 for continually removing treated sample 9 from the treatment zone 19'. However, the treatment zone 19' may instead comprise an in-situ mass of soil, as previously noted.

The first chamber 20 is provided to contain a porous matrix 59 having an affinity for anions. The first chamber 20 is preferably separated from the anode compartment 11' and the treatment zone 19' by porous separators 36', such as alumina frit or carborundum stones. As shown in FIG. 3, the first chamber 20 is connected to the anode compartment 11' by a teflon adaptor 23'. The first chamber 20 is optionally equipped with at least one auxiliary electrode 33' which extends into the first chamber 20 so that the electrode 33' is in contact with the porous matrix 59. The auxiliary electrode 33' is used to measure the electrical current flowing through the porous matrix 59.

The second chamber 21 is provided to contain a porous matrix 60 having an affinity for cations. The second chamber 21 is preferably separated from the cathode compartment 15' and the treatment zone 19' by porous separators 36', such as alumina frit or carborundum stones. As shown in FIG. 3, the second chamber 21 is connected to the cathode compartment 15' by a teflon adaptor 23'. The second chamber 21 is optionally equipped with at least one auxiliary electrode 33' which extends into the second chamber 21 so that the electrode 33' is in contact with the porous matrix 60. The auxiliary electrode 33' is used to measure the electrical current flowing through the porous matrix 60.

The present invention also relates to a method for removing charged species from a sample of contaminated liquid or porous solid waste. As used herein, the term "contaminant" refers to those heavy metals and radioactive substances which exceed concentrations and radiation levels established by federal and state regulatory agencies. Representative examples include lead, cesium (137), strontium (90) and uranium, per se, or materials of which they are components. The method of the invention is particularly effective for converting radionuclide and/or heavy metal-contaminated waste material into a form that is more readily immobilized.

Figure 4:
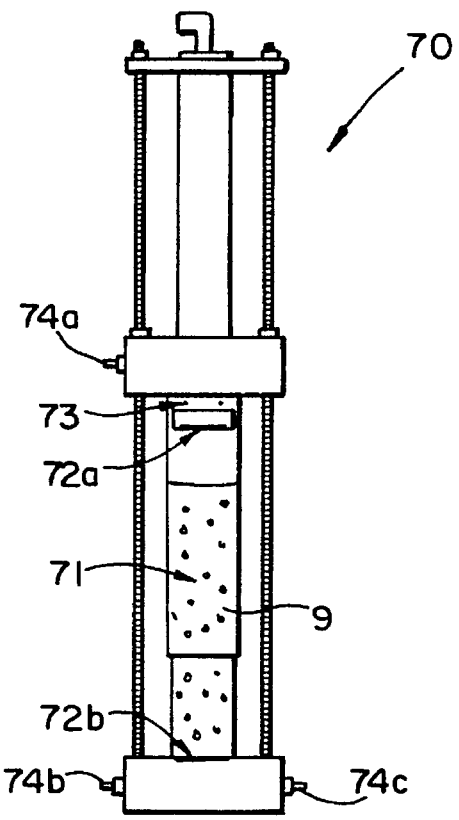
FIG. 4 is a side elevational view of a consolidation apparatus for pre-treatment of the contaminated waste.

In carrying out the method of the invention, a sample of contaminated waste material is deposited in the treatment zone of the electrochemical/electrokinetic apparatus described above. Preferably, the sample is consolidated prior to introduction into the treatment zone. The consolidation apparatus 70, as shown in FIG. 4, includes a chamber 71 for holding a sample of the waste material, with carborundum porous stones 72a and 72b at the top and bottom of the chamber 71. A pneumatic piston 73 regulated by air pressure applies pressure from the top of the sample 9, thereby consolidating and increasing the density of the sample 9. Tubing 74a, 74b and 74c located above and below chamber 71 allows excess fluid to drain from the sample 9. Following consolidation, the sample 9 is placed into the electrochemical/electrokinetic apparatus 10. In normal operations, the sample 9 is consolidated using the ASTM reference method (D2435). Alternatively, untreated sample 9 is continually flowed into the treatment zone 19 through an inlet 57 and treated sample 9 is continually removed from the treatment zone 19 through an outlet 58.

If the sample is sufficiently saturated with an electrolytic solution to create a salt bridge capable of carrying an electrical current from the cathode to the anode through the sample, a voltage gradient is applied between the anode and the cathode thereby inducing an electrical current to flow through the sample.

If, however, the sample is not sufficiently saturated with an electrolytic solution, an electrolytic solution is introduced into at least one of the anode and the cathode compartments. Since the treatment zone is in fluid connection with the anode and the cathode compartments, the electrolytic solution saturates the sample thereby creating a salt bridge capable of carrying an electrical current from the cathode to the anode through the sample. A voltage gradient is then applied between the anode and the cathode thereby inducing an electrical current to flow through the sample.

The current induces water and charged particles to migrate towards the anode or the cathode by electrochemical/electrokinetic processes. The electrolytic solution flows from the anode to the cathode by a process known as electroosmosis in soils containing negative surface charged particles. The process is expected to reverse direction when the soil contains predominantly positively charged particles. The flow of the electrolytic solution transports particles that are dissolved or suspended in the electrolytic solution. In addition, anions or negatively charged ions travel toward the anode, while cations or positively charged ions travel toward the cathode. Further, charged colloidal particles are also induced to flow either towards the anode or the cathode by the electrical current. As a result, anions and cations can be removed from the sample and concentrated near the anode and the cathode, respectively.

Because of the voltage gradient applied, water in the anode and the cathode compartments undergoes electrolysis and decomposes. Oxygen gas and hydrogen ions are produced at the anode, while hydrogen gas and hydroxide ions are produced at the cathode. Due to the evolution of gas at the anode and the cathode, each of the anode and the cathode compartment is preferably provided with a gas vent to allow the gases to escape from the anode and the cathode compartments. In addition, due to the electrode reactions, the electrodes are preferably isolated from the sample.

As a consequence of the formation of hydrogen ions at the anode, the electrolytic solution in the anode compartment becomes acidic. Since the hydrogen ions are positively charged, the hydrogen ions will be attracted to the cathode. The hydrogen ions will therefore travel through the sample in the treatment zone creating an acid front. This acid front may be beneficial for decontaminating the sample since the hydrogen ions will displace metal ions on the sample surfaces, thus making metal ions available for removal by electrochemical/electrokinetic processes.

Similarly, the negatively charged hydroxide ions formed at the cathode will travel toward the anode. In some situations, the hydroxide ions will hinder the decontamination process since certain metals, such as lead, can precipitate when in contact with hydroxide ions. Fortunately, the ionic velocity of hydrogen ions through the sample is typically faster than the velocity of hydroxide ions through the solid. Thus, the sample will be mostly acidic. One or more pH controllers 45 can be used to monitor and adjust the pH in the treatment zone, anode compartment, and cathode compartment to assure optimal decontamination conditions. The pH can be controlled manually or by a computer connected to a pH meter and a pump.

Another consequence of the formation of hydrogen ions at the anode and hydroxide ions at the cathode is that there is a possibility of recovering the acid formed at the anode and the base formed at the cathode. In the case of nuclear fuel reprocessing waste, the acid and base can then be recycled into the reprocessing of the fuels.

According to a preferred embodiment of the invention, an electrochemical/electrokinetic apparatus 10 is provided as shown in FIG. 3. The first chamber 20 is filled with a matrix material 59 having an affinity for anions. The matrix material 59 can optionally be consolidated prior to use as described above. Similarly, the second chamber 21 is filled with a matrix material 60 having an affinity for cations. The matrix material 60 in the second chamber 21 can also optionally be consolidated prior to use as described above. A sample 9 containing heavy metals or radionuclides is placed in the treatment zone 19'. The electrochemical/electrokinetic system 10 is then assembled.

The anode compartment 11' and the cathode compartment 15' are then filled with an electrolytic solution, such as water. This creates a salt bridge capable of carrying an electrical current from the cathode 16' to the anode 12' through the sample 9.

A voltage gradient is applied between the anode 12' and the cathode 16'. For example, a constant voltage of 30 volts can be applied across the electrodes 12' and 16'. As described above, the voltage gradient induces a current to flow between the cathode 16' and the anode 12' through the sample 9, thereby causing the water and charged particles to flow through the sample 9, as described above. Radionuclides, such as uranium, or cationic heavy metals will be impelled toward the cathode 16'. In so doing, the cationic heavy metals or radionuclides will encounter the matrix material 60 having an affinity for cations in the second chamber 21. The cationic heavy metals or radionuclides will therefore be retarded in their movement toward the cathode 16' and exchange for the cations already present in the matrix material 60, thereby preventing the heavy metals or radionuclides from reaching the cathode 16'.

This process can be further enhanced if the pH in the matrix material 60 in the second chamber 21 is maintained at a sufficiently high level. The cationic heavy metals or radionuclides reaching the matrix material 60 would then react with the hydroxide ions present in the matrix material 60 and precipitate. For example, when uranium is present in the sample as the uranyl salt, a series of hydroxide complexes is formed. Below a pH of about 6, the $UO_2(OH)_2 \cdot 2H_2O$ precipitates. At higher pH, anionic hydroxide species, such as $UO_2(OH)_3^-$ and $UO_2(OH)_4^=$, occur, which would migrate toward the anode 12'. Therefore, if the electrolytic solution in the cathode compartment 15' is maintained at a pH of above about 6 and the matrix material 60 is maintained at a pH of below about 6, uranium will accumulate in the matrix material 60 and will not accumulate in the cathode compartment 15'. The pH in the matrix material 60 can be adjusted manually or by a computer connected to a pH meter and a pump.

If the contaminant present in the sample 9 is the heavy metal cation cesium, the sample 9 can be pretreated with a clay having a high affinity for cesium to remove some of the cesium from the salt. An example of a clay having a high affinity for cesium is montmorillionite. Since the clay has a high affinity for cesium, cesium will preferentially bind to the clay where it will not be readily removed by washing. The decanted liquid from the treatment can then be treated in accordance with the present invention.

The choice of matrix materials, 59 and 60, is important for achieving optimal removal of the ionic salt species while retaining the contaminants of concern in the matrix materials, 59 and 60. The matrix materials, 59 and 60, must allow the ionic salt species to pass unretarded through the matrix materials, 59 and 60, while preventing the contaminants to pass to the anode or the cathode compartments, 11' and 15'. Adjustment of the exchange capacity through pH and redox potential modification can be used to enhance the removal of salts, as discussed above. Various clays and zeolites are potentially useful as matrix materials, 59 and 60, in practicing the present invention. For example, montmorillionite clays and zeolites have a higher affinity for cations than kaolinite clays. Also, Andisols soil clays are useful for retardation of anion transport. In addition, it may be possible to use montmorillionite in the second chamber 21 to trap cesium along with other heavy metals and radionuclides.

An analogous arrangement can be used to retain anionic species, such as technetium and iodine, on the matrix material 59 having an affinity for anions. The anionic species will be impelled toward the anode 11'. During transport, the anionic species will encounter the matrix material 59 having an affinity for anions in the first chamber 20. The anionic species will therefore be retarded in their movement toward the anode 12' and exchange for the anions already present in the matrix material 59 thereby preventing the anionic species from reaching the anode 12'.

The system and method of the present invention can be applied to water and ion transport in partially saturated soils, such as those found in vadose (water just below the earth's surface) zone and semi-arid soil regions, as well as in saturated zones and groundwater. The present invention can also be used to treat anionic as well as cationic soils. Additionally, the present invention is applicable to the treatment of industrial sludges and nuclear wastes.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the following claims.

What is claimed is:

1. An electrokinetic system for removing a charged species, selected from the group consisting of cations and anions, from a sample in which said charged species is commingled with at least one contaminant, said contaminant comprising at least one charged component selected from the group consisting of an anionic component, a cationic component or a mixture thereof, said system comprising:

a plurality of electrode compartments including an anode compartment comprising an anode and a cathode compartment comprising a cathode;

a treatment zone in fluid communication with said anode and said cathode compartments for containing said sample, said treatment zone including at least one chamber disposed adjacent at least one of said electrode compartments and adapted to contain a porous matrix material having affinity for said charged component of said contaminant;

means for applying a voltage gradient across said anode and said cathode which induces electrical current flow through said sample in said treatment zone, causing any cations present in said sample to migrate toward said cathode compartment and any anions present in said sample to migrate toward said anode under the influence of said electrical current flow; and a pH controller comprising a monitoring means for monitoring acidity and basicity and an adjusting means responsive to said monitoring means for adjusting the acidity and basicity in the treatment zone to promote migration of said charged species from said treatment zone while maintaining said at least one contaminant within said treatment zone.

2. The system as claimed in claim 1 further comprising at least one porous separator disposed between said at least one chamber and at least one of said anode compartment and said cathode compartment.

3. The system as claimed in claim 1 wherein at least one of said anode compartment and said cathode compartment further comprise a port adapted for introducing or removing an electrolytic solution.

4. The system as claimed in claim 3 further comprising at least one flow monitor attached to said port adapted for monitoring flow of said electrolytic solution.

5. The system as claimed in claim 1 further comprising at least one auxiliary electrode within said treatment zone for monitoring the electrical current flow through said sample in said treatment zone.

6. The system as claimed in claim 1 wherein said treatment zone additionally comprises an inlet and an outlet adapted for continually flowing untreated sample into and treated sample out from said treatment zone.

7. The system as claimed in claim 1 wherein at least one of said anode and said cathode compartment further comprises a gas vent.

8. The system as claimed in claim 1 wherein said at least one chamber is disposed adjacent the anode and said porous matrix material has affinity for anionic components of said contaminant and is selected from the group consisting of kaolinite and Andisols clay.

9. The system as claimed in claim 1 wherein at least one of said anode and said cathode compartments further comprise a pH controller for monitoring and adjusting pH.

10. The system as claimed in claim 1 wherein said at least one chamber is disposed adjacent the cathode and said porous matrix material has affinity for cationic components of said contaminant and is selected from the group consisting of kaolinite and montmorillionite.

11. A method for removing charged species, selected from the group consisting of cations and anions, from a sample in which said charged species is commingled with at least one contaminant, said method comprising the steps of:

providing an electrokinetic system as claimed in claim 1;

containing said sample within the treatment zone of said electrokinetic system;

applying a voltage gradient between said anode and said cathode to induce an electrical current flow through said sample and cause any cations present in said sample to migrate toward said cathode compartment and any anions present in said sample to migrate toward said anode compartment under the influence of said electrical current flow; and monitoring and adjusting the pH in said system to promote migration of said charged species from said sample while maintaining said at least one contaminant within said treatment zone.

12. The method as claimed in claim 11 further comprising the step of introducing an electrolytic solution into at least one of said anode compartment and said cathode compartment of said electrokinetic system.

13. A method as claimed in claim 11, wherein said contaminant is selected from the group consisting of radionuclides, heavy metals, or a combination thereof.

14. The method as claimed in claim 13 wherein said sample comprises cesium.

15. The method as claimed in claim 14 further comprising the step of pretreating said sample with a substance having affinity for cesium prior to containing said sample within the treatment zone.

16. The method as claimed in claim 15 wherein the step of pretreating said sample comprises contacting said sample with montmorillionite.

17. The method as claimed in claim 11 further comprising the step of vitrifying said sample from which said charged species have been removed.

18. An electrokinetic system for removing a charged species, selected from the group consisting of cations and anions, from a sample in which said charged species is commingled with at least one contaminant, said contaminant comprising at least one charged component selected from the group consisting of an anionic component, a cationic component or a mixture thereof, said system comprising:

an anode compartment comprising an anode;

a cathode compartment comprising a cathode;

a treatment zone in fluid communication with said anode and said cathode compartments for containing said sample, said treatment zone including a first chamber disposed adjacent said anode compartment and adapted to contain a porous matrix material having affinity for said anionic component of said contaminant and a second chamber disposed adjacent said cathode compartment and containing a porous matrix material having affinity for said cationic component of said contaminant;

means for applying a voltage gradient across said anode and said cathode which induces electrical current flow through said sample in said treatment zone, causing any cations present in said sample to migrate toward said cathode compartment and any anions present in said sample to migrate toward said anode under the influence of said electrical current flow; and a pH controller comprising a monitoring means for monitoring acidity and basicity and an adjusting means responsive to said monitoring means for adjusting the acidity and basicity in the treatment zone to promote migration of said charged species from said treatment zone while maintaining said at least one contaminant within said treatment zone.

19. The system as claimed in claim 18 wherein at least one of said anode compartment and said cathode compartment further comprise a port adapted for introducing or removing an electrolytic solution.

20. The system as claimed in claim 19 further comprising at least one flow monitor attached to said port adapted for monitoring flow of said electrolytic solution.

21. The system as claimed in claim 18 further comprising at least one auxiliary electrode within said treatment zone for monitoring the electrical current flow through said sample in said treatment zone.

22. The system as claimed in claim 18 wherein at least one of said anode and said cathode compartments further comprise a pH controller adapted for monitoring and adjusting pH.

23. The system as claimed in claim 18 wherein said treatment zone comprises an inlet and an outlet for continually flowing untreated sample into and treated sample out from the treatment zone.

24. The system as claimed in claim 18 wherein at least one of said anode compartment and said cathode compartment further comprise a gas vent.

25. The system as claimed in claim 18 further comprising a sample container positioned in said treatment zone between said first chamber and said second chamber.

26. The system as claimed in claim 18 further comprising a first porous separator separating said sample container from said first chamber and a second porous separator separating said sample container from said second chamber.

27. A method for removing charged species, selected from the group consisting of cations and anions, from a sample in which said charged species is commingled with at least one contaminant said contaminant comprising at lease one charged component selected from the group consisting of an anionic components, a cationic component or a mixture thereof, said method comprising the steps of:

providing an electrokinetic system as claimed in claim 18;

containing the sample within the treatment zone of said electrokinetic system;

introducing a porous matrix material having affinity for any anionic components of said contaminant into said first chamber of said electrokinetic system;

introducing a porous matrix material having affinity for any cationic components of said contaminant into said second chamber of said electrokinetic system; and applying a voltage gradient between said anode and said cathode to induce an electrical current flow through said sample and cause any cations present in said sample to migrate toward said cathode compartment and any anions present in said sample to migrate toward said anode compartment under the influence of said electrical current flow while maintaining said contaminant within at least one of said sample and said porous matrix.

28. The method as claimed in claim 27 further comprising the step of introducing an electrolytic solution into at least one of said anode compartment and said cathode compartment of said electrokinetic system.

29. The method as claimed in claim 27 wherein said contaminant is selected from the group consisting of radionuclides, heavy metals, or a combination thereof.

30. The method as claimed in claim 29 wherein said sample comprises cesium.

31. The method as claimed in claim 27 further comprising the step of pretreating said sample with a substance having affinity for cesium prior to containing said sample within said treatment zone.

32. The method as claimed in claim 31 wherein the step of pretreating said sample comprises contacting said sample with montmorillionite.

33. The method as claimed in claim 27 further comprising the step of vitrifying said sample from which said charged species have been removed.

34. The method as claimed in claim 27 further comprising the step of monitoring and adjusting the pH of said system to promote removal of salts from said sample while retaining said contaminant within said sample.

\* \* \* \* \*